United States Patent [19]

Gronau et al.

[11] Patent Number: 4,620,486
[45] Date of Patent: Nov. 4, 1986

[54] RAIL-GUARD TRANSPORTATION SYSTEM

[75] Inventors: Paul Gronau, Berlin; Jürgen Gronau, Bergisch Gladbach, both of Fed. Rep. of Germany

[73] Assignee: Kottgen GmbH & Co. Kommanditgesellschaft, Bergisch Gladbach, Fed. Rep. of Germany

[21] Appl. No.: 573,511

[22] Filed: Jan. 25, 1984

[30] Foreign Application Priority Data

Mar. 30, 1983 [EP] European Pat. Off. ........ 83103156.2

[51] Int. Cl.⁴ .......................... E01B 25/12; B61B 13/04
[52] U.S. Cl. .................................... 104/121; 104/130; 104/247; 105/147
[58] Field of Search .............. 104/121, 130, 247, 118; 105/147, 141, 144, 145, 146; 295/7, 1, 31 R, 34; 246/457

[56] References Cited

U.S. PATENT DOCUMENTS

| | | | |
|---|---|---|---|
| 1,699,544 | 1/1929 | Rohlfing | 105/147 |
| 3,403,634 | 10/1968 | Crowder | 295/1 X |
| 3,408,950 | 11/1968 | Puhringer | 246/457 X |
| 3,593,668 | 7/1971 | Adams | 104/130 |
| 3,628,462 | 1/1971 | Holt | 104/130 X |
| 3,986,747 | 10/1976 | Raquet et al. | 295/7 X |

FOREIGN PATENT DOCUMENTS 2100854  7/1972  Fed. Rep. of Germany .

Primary Examiner—Robert B. Reeves
Assistant Examiner—David F. Hubbuch
Attorney, Agent, or Firm—Spensley Horn Jubas & Lubitz

[57] ABSTRACT

On one ground rail only, a vehicle containing upper and lower bogies is rolling. The vehicle is guided from above at a ceiling rail. Each lower bogie contains a bogie wheel which is provided with lateral flanges. The ground rail includes a head profile, the upper side of which is interrupted at branch points of the rail by slots to guide the flanges of the bogie wheel. The depth of the slots is substantially less than the height of the head profile. Guide rollers, which can be lifted individually under control to determine the travel direction at the branch points, laterally engage the head profile.

11 Claims, 10 Drawing Figures

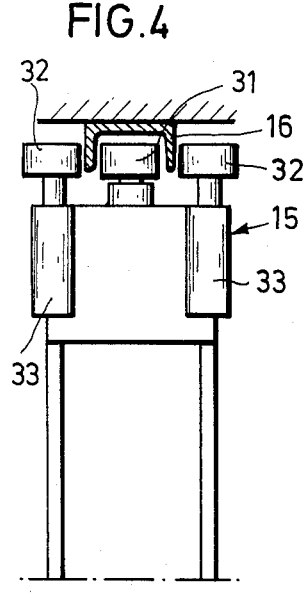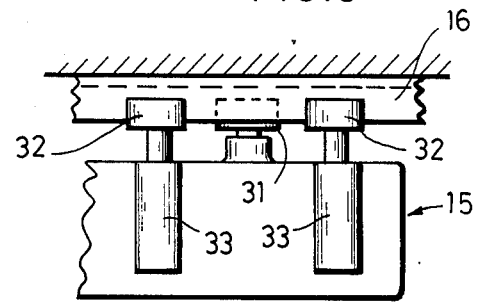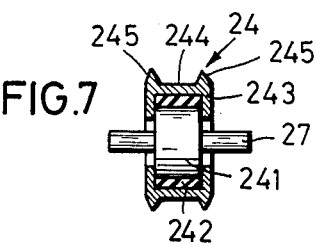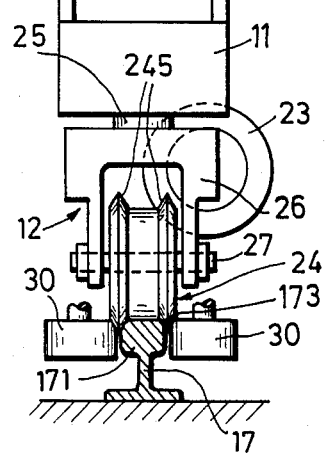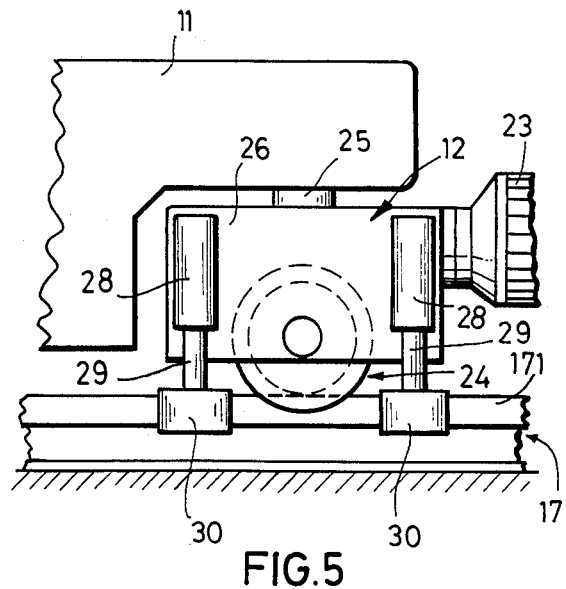

RAIL-GUARD TRANSPORTATION SYSTEM

FIELD OF THE INVENTION

The invention relates to a rail-guided transportation system comprising a ground rail, an upper rail and vehicles guided at the rails by bogies rotatable about vertical axles, each bogie having a bogie wheel rolling on the appertaining rail and guide rollers arranged laterally adjacent the bogie wheel.

BACKGROUND OF THE INVENTION

It has been known to use for steering streetcars a rail system wherein, parallel to each rail on which the wheels are rolling, a guide rail is arranged in which guide rollers are running which are mounted at the car body (DE-A-473 106). The inside of the bogie wheel is provided with a flange, while no flange is provided at its outside. The guide rollers may be lifted individually from the appertaining guide rail by control through magnetic coils. At the junctions or switch-points of the rail system, the guide rollers which are engaging a guide rail cause the steering of the associated bogie so that the streetcar is following the corresponding rail track which is predetermined by the active guide rollers. By this means, ground switchpoints with adjustable tongues are unnecessary. However, when a rail track is used that branches off a straightly extending continuous track, the treads of the outer wheels do not rest any longer on the rail for a longer distance of the path. In addition, said system cannot be used for vehicles running on one sole rail only because no lateral guidance is ensured with wheels having only one sole flange.

There has been also known a rail-guided servicing system (DE-C-21 00 854) wherein the vehicles extend between the ground rail and an upper rail. The bogie wheel or bogie wheels of a vehicle are guided in the U-shaped ground rail. In the direction of travel in advance of the bogie wheels, lateral guide rollers are mounted which, at junctions or branchings of the rail system, can be lowered individually in respective guide rails which extend laterally along the main rails. Similar guide rollers are provided at the upper rail system. The guide rollers at the ground rail system and at the upper rail system are controlled synchroneously thus avoiding a divergence between the upper and lower guide paths of the vehicle. The single rail conveying system (i.e. including one sole ground rail) is used as a transportation means for storage racks. The vehicles may travel on floors between racks in a storehouse. They are provided with a lifting structure at which a platform movable vertically is guided to lift loads to the height of the required rack shelves. It is again disadvantageous in this known system that the bogie wheels are not guided laterally with a sufficient accuracy over a considerable distance in case of junctions or switchpoints because the flanges of the U-shaped ground rail are divergent in said area.

It is the object of the invention to provide a rail-guided transportation system of the above mentioned type wherein the exact guiding of the bogie wheels is possible in case of junctions or branchings the interruption of the rail profile being reduced to a minimum.

SUMMARY OF THE INVENTION

To solve this problem, it is provided according to the invention, that the ground rail has a head profile engaged by lateral flanges of the bogie wheel, and that at the junction and branchings, in diverging tracks of the ground rail, the head profile is provided with slots whose width approximately corresponds to the width of the flanges.

In the conveying system of the invention, lateral flanges are fitted at both sides of the bogie wheels. However, the radial extension of the flanges is inferior to the height of the head profile of the rail. Hence, at an Y-shaped junction, preferably only two narrow slots are necessary in the head profile, one slot extending obliquely within the main track, the other extending in parallel to the main track at the point at which the branching track changes over into the main track. It is ensured accordingly that the cylindrical tread surface of the bogie wheel keeps on resting fully on the upper side of the head profile of the rail, while both flanges of the bogie wheel are constantly coacting with the lateral face of the head profile. Only very narrow slots being necessary, the vehicle will not suffer from any shocks when travelling over the branching points. The support and guidance of the vehicle at the ground rail are clean and vibrationless. In each phase of the travel, both flanges of the bogie wheel are coacting with the sides of the head profile without any interruption of the lateral guidance of the bogie wheel.

Preferably, the width of the flanges and slots decreases to the outside. In other words, the inner flanks of the flanges are inclined and can be adapted at an angle of e.g. 45° to the oblique side walls in the upper region of the head profile of the rail, so that an exact guidance nearly free from backlash of the bogie wheel on the rail can be achieved with a good track holding quality. Although the outer flanks of the flanges may be vertical, the flanges according to a preferred embodiment of the envention - as well as the slots in the rails - are V-shaped. A V-shaped slot contour with two oblique flanks can be incorporated more easily in the head profile of the rail than a slot contour having a vertical flank.

A main point of the transportation system of the invention just like in other rail systems resides in the reduction of noise. According to a preferred embodiment of the invention, the bogie wheel contains a damping layer interposed between its core and its outer jacket. All elements of the bogie wheel coming into direct contact with the rail, i.e. the tread surface and the flanges, are at the jacket while the inner core is connected via the wheel axle to the vehicle body. The elastic damping layer absorbs sound transmission from the jacket via the core to the vehicle body.

One embodiment of the invention will be explained hereinafter in detail with reference to the drawings.

DESCRIPTION OF THE DRAWINGS

FIG. 3 is an enlarged illustration of the detail III in FIG. 2;

FIG. 4 is an enlarged illustration of the detail IV in FIG. 2;

FIG. 5 is an enlarged illustration of the detail V in FIG. 1;

FIG. 6 is an enlarged illustration of detail VI in FIG. 1;

FIG. 7 is a cross section of a bogie wheel;

DETAILED DESCRIPTION OF THE INVENTION

Figure 1:
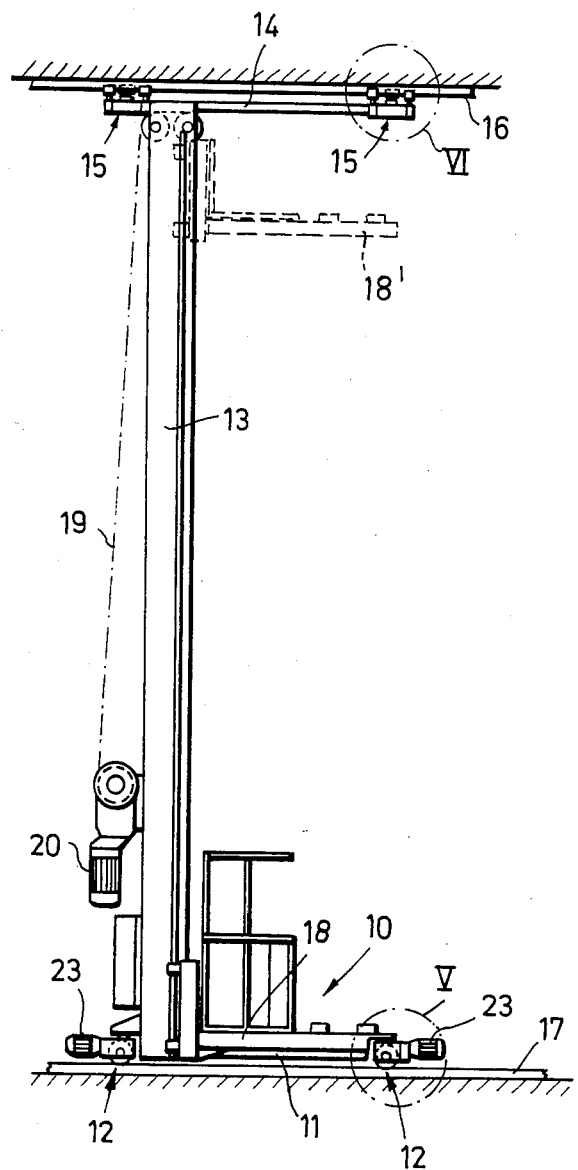
FIG. 1 is a side view of a vehicle as a track servicing device.
Figure 2:
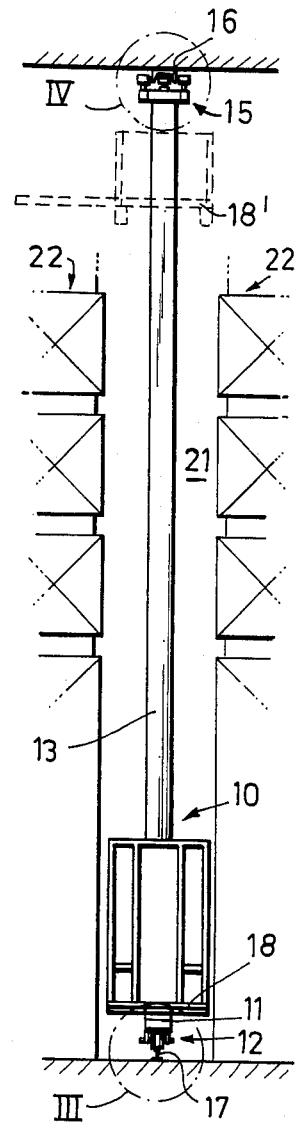
FIG. 2 is a front view of the vehicle according to FIG. 1.

The illustrated vehicle 10 or rack servicing device is comprised of a frame 11 provided at both its ends with a bogie 12 and from which extends a lifting structure 13 in vertical upward direction. At the upper end of the lifting structure 13, there is an upper frame 14 extending in longitudinal direction of the vehicle and being provided at its front and its rear end with one bogie 15 each. The upper bogies 15 move along an upper rail 16 secured to the ceiling of the room, while the lower bogies 12 travel on a ground rail 17 which is mounted on or in the ground. A vertically movable platform 18 is guided at the lifting structure 13 and adapted to receive loads. By means of an electric motor 20 said platform can be moved via a cable winch 19 between the lower position (the platform 18 being marked in continuous lines) and the maximimum lifting position (the platform 18' being marked in dashes) as shown in FIGS. 1 and 2. FIG. 2 shows more clearly in which way the vehicle 10 is directed on a narrow floor 21 between two high racks 22 to supply loads to shelves of different heights or to remove them therefrom.

Figure 8:
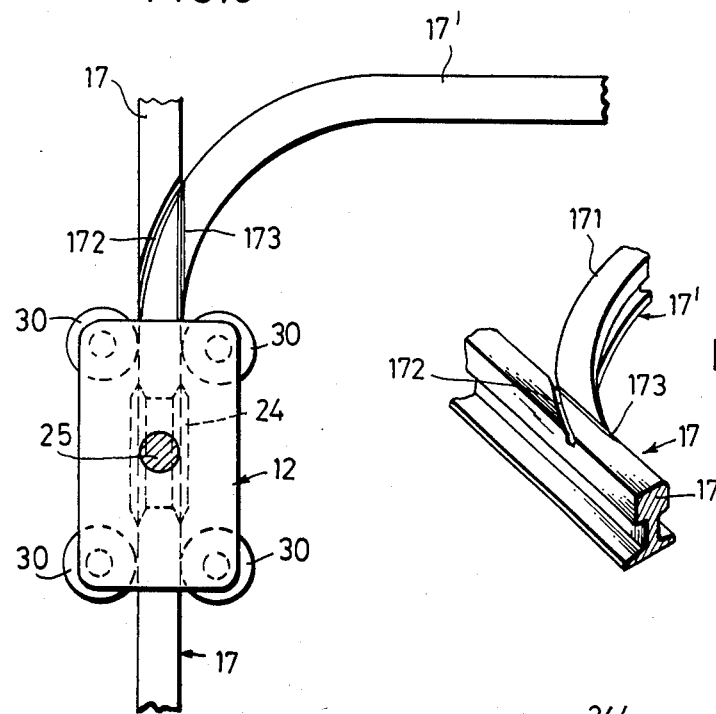
FIG. 8 is a plan view of a bogie.

The vehicle 10 is driven by electric motors 23 via the bogie wheels of the lower bogies 12. The design of the latter is clearly visible from FIGS. 3 and 5. Each of the bogies 12 is secured to the frame 11 via a vertical axle 25 which projects downwardly from the frame 11. Between the downwardly projecting legs of a U-shaped holder 26, the bogie wheel 24 with horizontal axle 27 is supported. At the outsides of the legs of the holder 26, adjusting means 28 are mounted, two of which are situated on each side of the holder 26. Each adjusting means 28 contains a bar 29 protruding in downward direction and at which a guide roller 30 is rotatably supported. The adjusting means 28 can include, for instance, a solenoid which, when actuated, will lift the respective bar 29. When the solenoid is de-energized, the guide roller 30 is as high as the head profile or top section 171 of the rail 17 (hereinafter the "lowered position"). If the adjusting means 28 is actuated, the respective guide roller 30 is lifted to a level above the head profile 171 such as obvious from the left guide roller 30 in FIG. 10 (hereinafter the "raised position"). The guide rollers 30 are offset from the bogie wheel 24 with respect to the longitudinal direction of the vehicle. Two guide rollers 30 each are situated in front of the bogie wheel 24, while the two other guide rollers are situated behind the bogie wheel 24 (FIG. 8). The front two guide rollers 30 are guided, when in the lowered position, by the lateral faces of the head profile 171. As a result, rotation of the bogie 12 about the axis 25 is caused by the guide rollers 30 laterally engaging the head profile 171. Thus use of the guide rollers 30 enables the bogie wheel to automatically adjust itself to the course of the rail 17.

The upper bogies 15 illustrated in FIGS. 4 and 6 comprise a bogie wheel 31 which engages the inside of the U-shaped rail 16. The wheel 31 is rotatable about a vertical axis and is guided laterally by the legs of rail 16, and also by four guide rollers 32. The guide rollers 32 are arranged at the bogie 15 in the same way as the guide rollers 30 are arranged at the lower bogies 12. In the raised position, said guide rollers 32 are as high as the legs of the rail 16 and engage the outsides thereof. Each of the guide rollers 32 is movable vertically using the adjusting means 33. If the latter is actuated, the corresponding guide roller 32 will be in a lowered position and disengaged relative to the rail 16. Each upper bogie wheel 31 is situated exactly centrally above a lower bogie wheel 24, and two guide rollers 30 and 32 are located along a common vertical axis. The control of the adjusting means 28 and 33 of said bogie wheels 30 and 32 provided along a common vertical axis, is performed synchronously thus ensuring that the distance along the upper rail 16 taken by the upper bogie is just the same as that covered by the lower bogie at the ground rail 17.

FIG. 7 shows a cross section of one of the lower bogie wheels 24 comprising a cylindrical core 241 enclosed at its periphery by an annular damping layer 242, e.g., of elastomeric material. A horizontal axle 27 is secured to the core 241. The damping layer 242 is surrounded by a jacket 243 which forms the cylindrical tread surface 244, both sides of which have a radially projecting flange 245 of a triangular cross section in the instant embodiment and tapered outwardly in radial direction.

The vibrations which are caused when the jacket 243 rolls on the ground rail 17, are absorbed by the elastomeric damping layer 242 before they are transmitted via the axle 27 to the holder 26 and to the frame 11, so that the sound reflection of the travelling noise is reduced accordingly.

Figure 9:
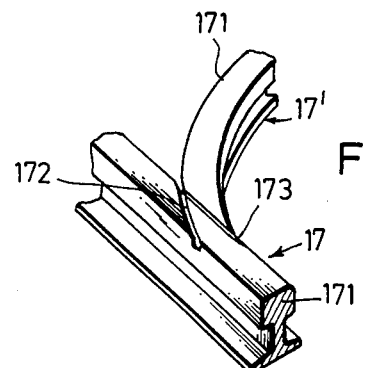
FIG. 9 is a perspective view of the ground rail at a branching.
Figure 10:
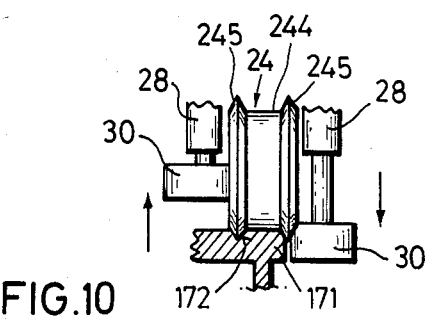
FIG. 10 is an illustration of the bogie wheel being on the point of entering the branch track according to FIG. 9.

FIGS. 8, 9 and 10 show the point at which a rail track 17 branches off a straight continuous rail 17. At the branching point, the upper side of the thicker head profile 171 of rail 17 is provided with an arcuate or V-shaped slot 172. Its width, depth and shape correspond to the contour of a flange 245 of the bogie wheel 24. The depth of the slot 172 is less than the height of the head profile 171 thus resulting in minimum interruption of the head profile 171 by slot 172. Just like flange 245, the width of slot 172 is small, thus interrupting only a very small area of the upper tread surface of the head profile 171. Due to the obliqueness of the slot 172 along the rail 17, the contact between the tread surface 244 of the bogie wheel 24 and the upper side of the head profile 171 is constantly maintained during the travel over the rail branching.

Another slot 173 extending laterally along the rail 17 to receive the right-hand flange 245 for straight travel is provided at the point where the rail track 171 joins the rail 17. The contour of slot 173 is identical to that of slot 172.

If the bogie 12 shown in FIG. 8 is to travel from the rail track 17 to the rail track 17', the left-hand guide rollers 30 are lifted while the right-hand guide rollers 30 are maintained in the height of the head profile 171. The right-hand front guide roller 30 is pressed to the right by the head profile of the rail track 17' thus swiveling to the right the bogie 12 about the vertical axis 25. When the travel goes on, the left-hand flange 245 of the bogie wheel is introduced into slot 172 and the right-hand flange 245 joins laterally the head profile 171 of the trail track 17'. As a result, the bogie 12 is moving on the rail track 17'.

If alternatively, the bogie 12 shown in FIG. 8 is to move straight on along rail track 17, the two right-hand guide rollers 30 are lifted to prevent them from contacting the rail track 17', while the left-hand guide rollers 30 maintain their lateral contact with the rail 17. The right-hand flange 245 then runs through the slot 173, and accordingly, the bogie 12 moves straight along the rail track 17.

As mentioned before, above the branch point illustrated in FIG. 8, there is a corresponding point in the upper rail 16, the guide rollers 32 being controlled synchronously with the guide rollers 30 thus ensuring congruency between the upper and lower guiding systems.

As evident from FIG. 3, the head profile 171 of the ground rail 17 has a plane upper treading surface being limited laterally by oblique faces 173. The inclination of the oblique faces 173 corresponds to the inclination of the inner flanks of flanges 245 thus enabling the bogie wheel 24 to fully seat on the head profile 171. This allows movement of the bogie along the rail without any significant lateral play. If the bogie wheel 24 tends to be displaced laterally on the rail 17, it will be pressed back firmly to the rail by the cooperation of the inclined faces 173 with the flanges 245 and by the weight of the vehicle.

What is claimed:

1. In a rail-guided transportation system comprising a ground rail having diverging tracks including junctions and switch points, an upper rail and vehicles guided at the rails by bogies rotatable about vertical axles, each bogie being provided with a bogie wheel running on the associated rail with guide rollers arranged laterally in advance of the bogie wheel, the improvement wherein:
   the bogie wheel running on said ground rail has lateral flanges and said ground rail contains a head profile engaged by said lateral flanges, and wherein;
   at said junctions and switch points, in diverging tracks of the ground rail, the head profile is provided with slots whose width corresponds approximately to the width of the flanges, said bogie wheel remaining in entire continuous engagement with said head profile as said bogie wheel follows said slots through said junctions and switch point without tilting.

2. Transporation system according to claim 1, wherein the width of the flanges decreases toward the periphery of the bogie wheel, and wherein the slots are adapted to the shape of the flanges.

3. Transportation system according to claim 2 wherein the flanges and the slots are V-shaped.

4. Transportation system according to claim 1 wherein at least one of said bogie wheels contains a damping layer interposed between an inner core and an outer jacket.

5. Transportation system according to claim 1 wherein the guide rollers have vertical axles and laterally engage the head profile.

6. Transportation system according to claim 1 wherein the guide rollers can be moved individually in the vertical direction to effectuate a selective guidance of said bogie at a junction or switch point.

7. A rail-guided transportation system comprising:
   a branched ground rail having a top section and having at least one branch point, the top section of said ground rail having upper and side surfaces, a portion of the top section of said ground rail adjacent the branch points having branch slots found therein;
   an upper rail; and
   at least one vehicle spaced between the ground rail and the upper rail, the vehicle having a lower bogie, the lower bogie being rotatable about an axle extending from the vehicle;
   the bogie comprising a generally cylindrical bogie wheel having at least one peripheral flange, the width of the flange being less than the width of the slots, and at least one generally cylindrical guide roller positioned laterally of the bogie wheel and selectably engageable with the side surfaces of said ground rail, such that when the peripheral flange of the bogie wheel engages a branch slot at a branch point, and a guide roller is in selected engagement with one side surface of said ground rail, a change in the direction of the vehicle as it travels along the ground rail is facilitated, said bogie wheel remaining in line contact with said ground rail substantially completely across the entire wheel periphery without tilting.

8. A rail-guided transportation system according to claim 7 wherein the flange is slidably insertable into a branch slot.

9. A rail-guided transportation system according to claim 7 wherein the flange and branch slot are matchingly shaped.

10. A rail-guided transportation system according to claim 7 wherein each guide roller is selectively vertically movable into and out of engagement with a side surface of the ground rail top section.

11. A rail-guided transportation system comprising:
   a branched ground rail with an upper surface, said branched ground rail having junctions and switch points;
   a branched upper rail;
   a vehicle guided between said ground rail and said upper rail, said vehicle having a lower bogie with a support bogie wheel riding continuously upon substantially all of any given line of contact of said upper surface of said ground rail, said support bogie wheel having flanged guides extending radially from its periphery also in contact with said round rail to continuously impart guidance to said support bogie wheel;
   said bogie further having at least two vertically adjustable guidance wheels laterally in advance of said support bogie wheel to guide said support bogie wheel along said ground rail at said junctions and switch points by selective individual vertical adjustment of said guidance wheels.

* * * * *